Figure 10:
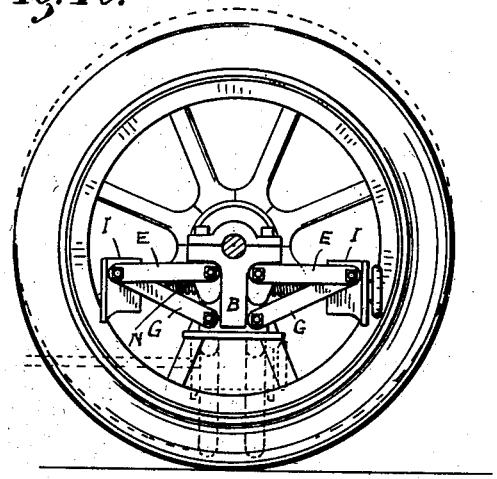

No. 896,853. PATENTED AUG. 25, 1908.
I. P. NELSON, A. L. MEEKS, T. O. SHAPPELL & J. A. SMALLEY.
LIFTING JACK FOR MOTOR CARS.
APPLICATION FILED JULY 15, 1907.
2 SHEETS—SHEET 1.
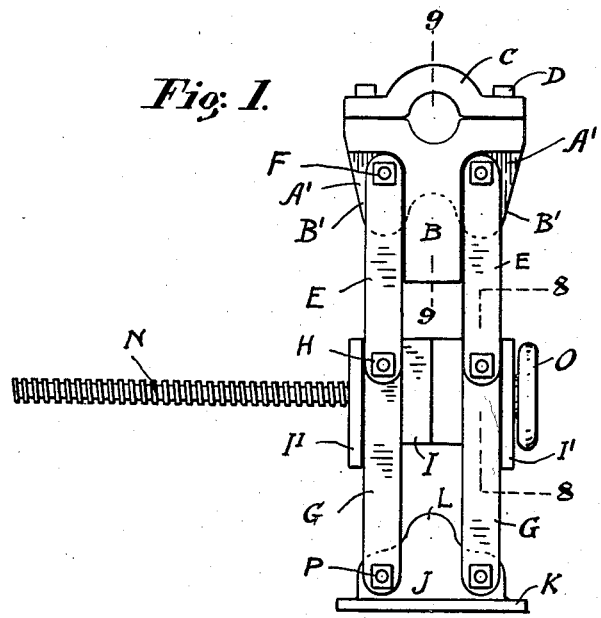
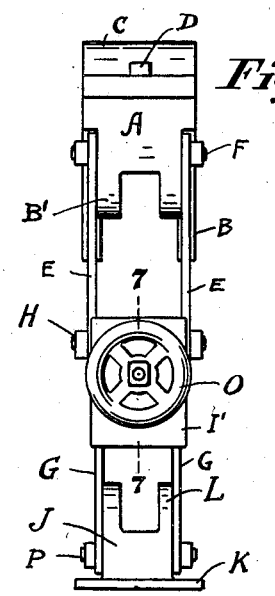
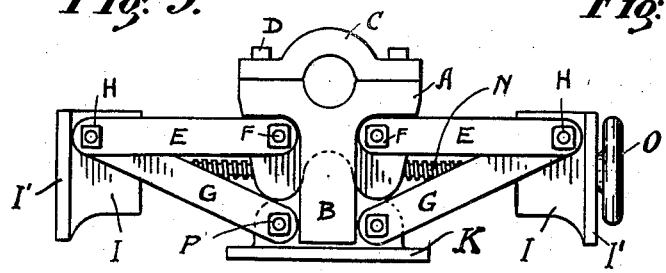
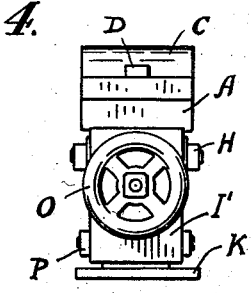
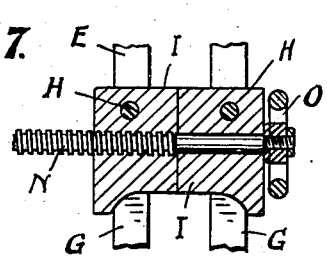
WITNESSES:
Ethel L. Lister
Arthur F. Runyan
INVENTORS.
Ira P. Nelson,
Allen L. Meeks,
Torence O. Shappell,
James A. Smalley.
BY
Thomas L. Ryan
ATTORNEY No. 896,853. PATENTED AUG. 25, 1908.
I. P. NELSON, A. L. MEEKS, T. O. SHAPPELL & J. A. SMALLEY.
LIFTING JACK FOR MOTOR CARS.
APPLICATION FILED JULY 15, 1907.

2 SHEETS—SHEET 2.

WITNESSES:
Ethel L. Lister
Arthur F. Runyan

INVENTORS,
Ira P. Nelson,
Allen L. Meeks,
BY Torence O. Shappell,
James A. Smalley.
Thomas L. Ryan
ATTORNEY

UNITED STATES PATENT OFFICE.

IRA P. NELSON, ALLEN L. MEEKS, TORENCE O. SHAPPELL, AND JAMES A. SMALLEY, OF MONTPELIER, INDIANA.

LIFTING-JACK FOR MOTOR-CARS.

No. 896,853.　　　　　Specification of Letters Patent.　　Patented Aug. 25, 1908.

Application filed July 15, 1907. Serial No. 383,725.

*To all whom it may concern:*

Be it known that we, IRA P. NELSON, ALLEN L. MEEKS, TORENCE O. SHAPPELL, and JAMES A. SMALLEY, citizens of the United States, and residents each of the city of Montpelier, in the county of Blackford and State of Indiana, have invented a new and useful Lifting-Jack for Motor-Cars, of which the following is a specification.

Our invention relates to improvements in lifting-jacks for motor-cars and other heavy vehicles and has especial reference to devices of this character for automobiles of modern construction having wheels with pneumatic resilient tires.

In caring for, handling, and repairing automobiles it is very desirable and necessary to accomplish the raising or elevating easily and quickly of the vehicle or a portion thereof.

Objects of our invention are to provide a device to attain these results and other useful purposes, and are accomplished by the mechanism described in this specification and illustrated in the accompanying drawings.

Other objects are to provide a device of the kind described which will be economical of manufacture, durable, easy of manipulation and highly efficient.

Our invention consists essentially of oppositely disposed pairs of bars, each pair hingedly secured together, and having their upper and lower ends pivotally secured to a head-block and base-block respectively, and a screw device adapted to be revolved by the hand, disposed and secured with reference to the said hinged bars in such manner that the distance between the said head-block and base-block may be varied at pleasure, and may be locked in either of two extreme positions and retained immovably in any desired intermediate position the entire device being adapted to be secured to the axle-beam or frame work of the vehicle.

Our invention consists further in the novel and ingenious combination, construction and arrangement of parts, illustrated in the accompanying drawings, described in this specification and defined in the appended claims.

Similar characters of reference refer to corresponding parts throughout the several views, in which—

Figure 11:
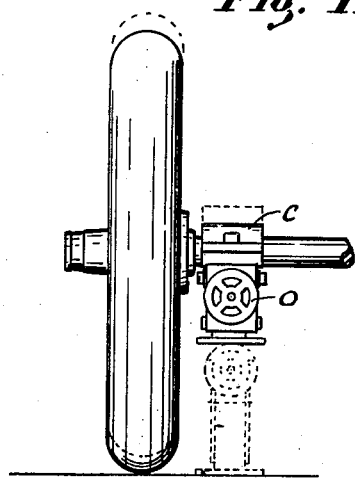
Figure 5:
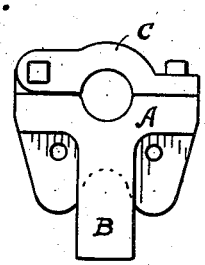
Figure 6:
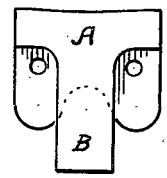
Figure 8:
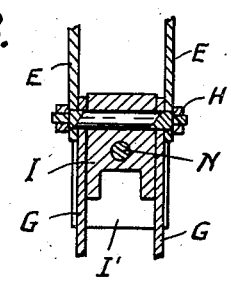
Figure 9:
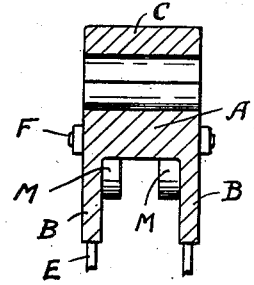

Figure 1 is a side view, and Fig. 2 is an end view of our improved lifting-jack in locked operative position. Fig. 3 is a side view and Fig. 4 is an end view of the same in locked inoperative position. Fig. 5 and Fig. 6 are side views of modified forms of head-blocks. Fig. 7 is a longitudinal central sectional view of the lift-blocks and connections, taken on the line 7—7 Fig. 2. Fig. 8 is a transverse sectional view taken on the line 8—8 Fig. 1. Fig. 9 is a transverse sectional view of the head-block taken on the line 9—9 Fig. 1. Fig. 10 and Fig. 11 are side views of our invention connected to the axle-beam of an automobile, and in the locked inoperative position.

A designates the head-block having the two centrally depending legs B, and the four depending bosses $B^1$ so formed that the recesses $A^1$ and the cavities M are provided the purposes whereof will be hereinafter described.

C designates the head-block cap; the head-block and the head-block cap are provided with transverse semicircular grooves so disposed that a suitable opening for the axle-beam of the vehicle is provided. This head-block cap is secured by the bolts D and by which bolts the device may be fastened securely to the axle-beam.

The oppositely disposed pairs of bars E are pivotally secured to the head-block by the bolts F, and will reside movably in the recesses $A^1$, the other ends of these pairs of bars E, and the upper ends of similarly disposed pairs of bars G are pivotally secured by the bolts H, to the lift-blocks I. These lift-blocks are provided with the flanges $I^1$ the functions of which will be hereinafter described. The lower ends of the pairs of bars G are pivotally secured to the base-block J by the bolts P. This base-block is provided with the ample bottom K to afford proper bearing and stability therefor; the noses L of the base-block are provided so that when the device is brought to the locked inoperative position as shown in Figs. 3 and 4, these noses will snugly occupy the cavities M in the head-block. It will be observed that the lower portion of the head-block and the upper portion of the base-block are hollowed out longitudinally so that a suitable clearance and opening is provided for the lift-bar N when the device is in the locked inoperative position as shown in Fig. 3.

The lift-blocks I are provided with the transverse bolts H, upon which are pivotally connected the bars E and G, and the facing surfaces of these lift-blocks are machined sufficiently smooth so that a true jointure will be effected when they are brought together. The lift-bar N is threaded and passes through a properly threaded aperture in one of the lift-blocks, and is so shouldered and fitted in the other lift-block that it may freely revolve but may not move longitudinally therein. The hand wheel O properly secured to the said lift-bar affords efficient means whereby the lift-bar may be manipulated easily by the hand. A crank or a crank-wheel could be used, as well.

From the foregoing description of the construction of our invention the operation and utility of the same will be apparant.

The preferred embodiment of our invention is the construction as seen in the drawings, and in this form our newly invented lifting-jack is applicable to be connected to the axle-beams of vehicles and is intended especially for connection to automobiles having pneumatic tired wheels of modern construction.

The width of our improved devices may be varied so that the invention may be adapted to be connected to substantially all styles and patterns of machines now in use.

To apply our invention the head-block cap C is removed, the head-block is then placed in proper position underneath the axle-beam and the head-block cap replaced and drawn by the bolts D, directly into engagement with the axle-beam. While we have shown the transverse openings of a form provided for the reception of an axle which is round in cross-section, it is obvious that this opening may be varied in form to fit axle-beams of various forms.

The normal positions of the parts when in inoperative position are as shown in Fig. 3 and Fig. 10, the base-block having been drawn by the revolutions of the lift-bar, into locked engagement with the head-block; in this position the device occupies comparatively small space, is very compact, and rattling or vibration of the parts is wholly prevented.

It is contemplated and intended that one of these jacks shall be connected adjacent each of the four corners of the frame of the vehicle, and are preferably connected to the axle-beams as hereinbefore described. When it is desired to lift the vehicle, so equipped, the hand-wheel O is rotated; as the lift-blocks approach each other the base-block descends to and meets the surface below, upon which the vehicle rests. By further rotation of the hand wheel the lift-blocks are drawn nearer and nearer together and the corner of the vehicle is supported upon the head-block as shown by the dotted line position of the jack, in Figs. 10 and 11. The hand-wheel O is further revolved sufficiently to bring the lift-blocks into position with their faces snugly together, the flanges I¹ will snugly engage the edges of the bars G, and the bars E will be brought into snug contact with the legs B and the jack will be locked in rigid upright position. The bosses B¹ of the head-block, and the extended lower portions of the lift-blocks are provided so that the bars E and G respectively will have sufficient bearing on their inner faces to render the device rigid and substantial transversely. The bolts F, H and P, as shown in Fig. 8 are shouldered and each is of such length from shoulder to shoulder against which the nuts are screwed, that when the nuts are screwed into secure position the bars will be retained in correct position but will at the same time be pivotally free. The lifting of the vehicle free from support upon its remaining tires is quickly accomplished by the manipulating of the remaining jacks in the manner above described.

When it is desired to return the vehicle to its original position, the hand-wheel of the jack is again revolved this time in a direction opposite, which causes the lift-blocks to separate and the head-block to descend, coincident with the release of the weight the base-block descends and is soon returned to its locked engagement with the head-block as shown in Fig. 10, and the jack is thus packed, locked up, and out of the way, but in readiness for immediate use at any time.

We have contemplated the employment of the modified form of the head-block as shown in Fig. 5, wherein the head-block cap is hingedly secured on one side so that the manipulation of but one bolt is necessary in connecting the jack to the axle-beam. The modified form of head-block as shown in Fig. 6 is employed where it is desired to use our invention for the purposes of an ordinary jack.

What we claim as our invention and desire to secure by Letters Patent, is—

1. A device of the kind described comprising a head-block, a base-block, oppositely disposed pairs of bars pivotally connected to the said head-block and to the said base-block, a pair of lift-blocks disposed opposite each other and having the meeting ends of the said pairs of bars pivotally connected thereto, means connecting the said lift-blocks to vary the distance between and maintain at varied distances apart, the said lift-blocks, including a threaded shaft adapted to engage one of said lift-blocks and to move revolubly, but not longitudinally in the other of the said lift-blocks, and having a crank thereon, substantially as described.

2. A device of the kind described comprising a head-block having rectangular vertically disposed protrusions on its sides, a base-block, oppositely disposed pairs of bars pivotally connected to the said head-block on either side of and adapted to register with said protrusions, said pairs of bars being also pivotally connected to the said base-block, a pair of lift-blocks disposed opposite each other and having the meeting ends of said pairs of bars pivotally connected thereto there being flanges on the outer sides of said lift-blocks adapted to register with the said pairs of bars, means connecting the said lift-blocks to vary the distance between and maintain securely together and at varied distances apart, the said lift-blocks, substantially as described.

3. A device of the kind described comprising a head-block having rectangular vertically disposed protrusions on its sides, a base-block, oppositely disposed pairs of bars pivotally connected to the said head-block on either side of and adapted to register with said protrusions, said pairs of bars being also pivotally connected to the said base-block, a pair of lift-blocks disposed opposite each other and having the meeting ends of said pairs of bars pivotally connected thereto there being flanges on the outer sides of said lift-blocks adapted to register with the said pairs of bars, means connecting the said lift-blocks to vary the distance between and maintain securely together and at varied distances apart, the said lift-blocks, including a threaded shaft adapted to engage one of said lift-blocks and to move revolubly but not longitudinally in the other of the said lift-blocks, and having a crank thereon, substantially as described.

In testimony whereof we have signed our names to this specification in the presence of two subscribing witnesses.

IRA P. NELSON.
ALLEN L. MEEKS.
TORENCE O. SHAPPELL.
JAMES A. SMALLEY.

Witnesses:
JOSEPH P. HORTON,
THOMAS L. RYAN.